United States Patent
Artioli et al.

[15] 3,645,160
[45] Feb. 29, 1972

[54] QUICK RELEASE PIN

[72] Inventors: Louis J. Artioli; Giulio V. Savioli, both of Davenport, Iowa

[73] Assignee: The United States of America as represented by the Secretary of the Army

[22] Filed: Oct. 7, 1969

[21] Appl. No.: 864,440

[52] U.S. Cl. ............................................................85/5 R
[51] Int. Cl. ...........................................................F16b 19/00
[58] Field of Search ..............85/3 S, 7; 24/213 C, 214, 215, 24/107

[56] References Cited

UNITED STATES PATENTS

| | | | |
|---|---|---|---|
| 530,083 | 12/1894 | Bradley | 85/3 S |
| 743,442 | 11/1903 | Brown | 85/3 S |
| 757,838 | 4/1904 | Pfleghan | 24/214 |
| 1,843,263 | 2/1932 | Bales | 85/3 S |

FOREIGN PATENTS OR APPLICATIONS

| | | | |
|---|---|---|---|
| 637,081 | 1/1928 | France | 24/214 |
| 573,227 | 11/1945 | Great Britain | 24/221 A |
| 481,541 | 3/1938 | Great Britain | 85/7 |

Primary Examiner—Edward C. Allen
Attorney—Harry M. Saragovitz, Edward J. Kelly, Herbert Berl and Albert E. Arnold, Jr.

[57] ABSTRACT

The joining of adjacent parts can be quickly and releasably accomplished by an elongated pin containing a unitary torsion member therein provided with flexible arms terminating in looped ends arranged to protrude from the opposite sides of the pin and prevent the withdrawal thereof from the adjacent parts until the pin is pulled with sufficient force to cam the looped ends back into the interior thereof. The torsion member provides a prestress action through the coil portion thereof engaging the walls of a cylindrical recess in the pin and outwardly diverging straight arms extending from the coil portion in linear contact with the wall surfaces of the recess.

1 Claim, 5 Drawing Figures

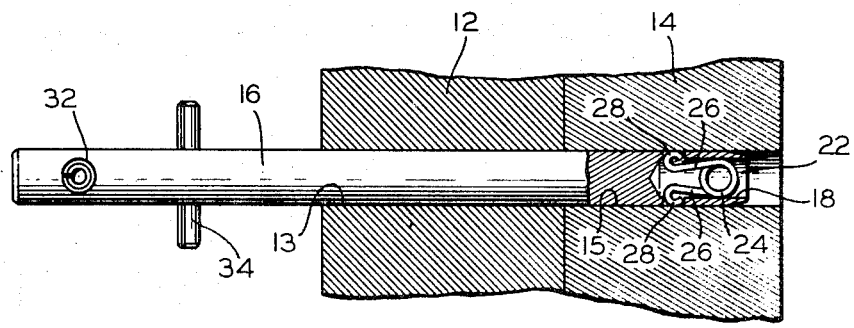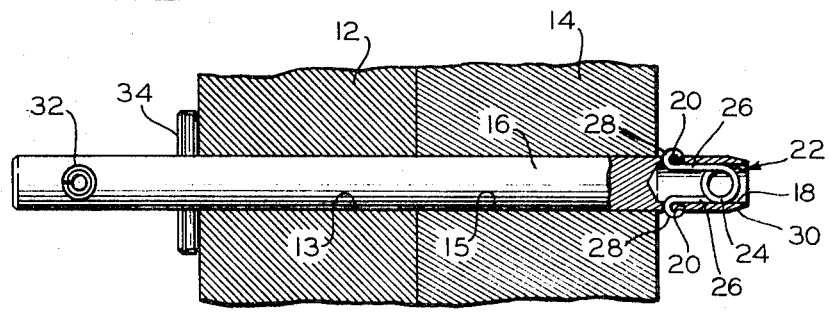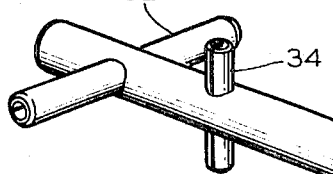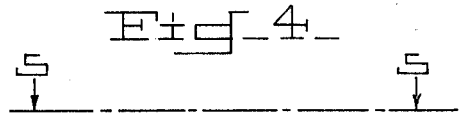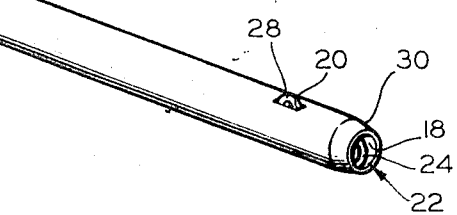
INVENTOR
Louis J. Artioli
Giulio V. Savioli
ATTORNEYS

QUICK RELEASE PIN

The invention described herein may be manufactured, used, and licensed by or for the Government for governmental purposes without the payment to us of any royalty thereon.

This invention relates to means for releasably joining juxtaposed parts and is more particularly directed to a self-retaining pin which can be installed in the operative position in one continuous motion and removed therefrom with equal simplicity and rapidity.

The joining of adjacent parts is frequently accomplished by a pin provided with a self-retaining unit at one end thereof designed to maintain the pin in operative position until a predetermined pulling force is applied to the opposite end thereof. Items of this type are commonly referred to as "quick release pins" and have heretofore utilized spring-biased balls to resist premature or accidental withdrawal from the parts to be joined. While such pins are highly reliable and efficient under static loading conditions, considerable difficulty has been encountered when the joined parts are subjected to dynamic loading or to repeated vibration. The resulting battering of the balls in their sockets frequently causes the balls to become so loose that they actually fall out and thereby destroy the ability of the pin to prevent separation of the joined parts. This is an extremely dangerous situation in many instances as, for example, where the pins are utilized to lock a high-speed automatic gun to a turret or a mount.

Current quick release pins which utilize spring-biased balls to prevent unwanted withdrawal thereof from the parts to be joined are also subject to excessive malfunction in a dusty or dirty environment. It has been found that the sockets in which the balls are retained rapidly accumulate sufficient foreign matter to adversely affect the extent to which the balls can be depressed into the body of the pin.

Accordingly, it is an object of this invention to provide a unitary locking device for releasably retaining a pin in position to join adjacent parts.

Another object of the present invention is the provision of a retaining pin with a simple and reliable unitary locking member which will not be adversely affected by dynamic or vibratory loading of the joined parts.

A further object of this invention is to provide a quick release retaining pin of the aforesaid type in which the flexibility of the locking member will prevent excessive accumulation of foreign matter in the area surrounding the member.

SUMMARY OF THE INVENTION

It has been found that these objects can best be attained by a cylindrical pin in which one end thereof is hollowed out to seat a torsion member consisting of a single coil and a pair of opposed straight flexible arms extending from opposite sides of the coil to terminate in reversed looped ends. Suitable holes or openings are provided in opposite sides of the pin to permit the protrusion of the looped ends which, once the pin is inserted through the parts to be joined, spring outwardly to prevent the subsequent removal of the pin until the latter is pulled with sufficient force to cam the looped ends back into the interior of the pin. The opposite end of the pin is provided with a handle to facilitate the manipulation thereof into and out of operative position. A stop is also provided in the handle end of the pin to halt the insertion thereof through the parts to be joined immediately upon the exit therefrom of the looped ends of the torsion member.

BRIEF DESCRIPTION OF THE DRAWINGS

The exact nature of the invention as well as other objects and advantages thereof will be readily apparent from consideration of the following specification relating to the annexed drawings wherein:

FIG. 1 is a vertical section through the adjacent parts to be joined showing the pin of the present invention being inserted through the parts, the pin being illustrated in full except for the end containing the torsion member;

FIG. 2 is a view similar to FIG. 1 but showing the pin in the retaining position thereof;

FIG. 3 is a perspective view of the pin;

FIG. 4 is an elevational view of the torsion member; and

FIG. 5 is a top view taken along line 5—5 in FIG. 4.

DESCRIPTION OF A PREFERRED EMBODIMENT

Referring more particularly to the drawings wherein similar reference characters have been employed to designate corresponding parts throughout, the retaining pin of the present invention is generally utilized to join adjacent parts, here identified as 12 and 14, by the insertion thereof into holes 13 and 15 through such parts. The body 16 of the retaining pin is an elongated member of conventional cylindrical configuration containing a centrally disposed axial cylindrical opening or recess 18 at one end. The pin body walls at the inner end of the recess are intersected by diametrically opposed holes or openings 20 preferably in the form of rectangular slots.

The interior of axial opening 18 is arranged to be occupied by a unitary torsion member 22 consisting of a single coil 24 provided with outwardly diverging straight arms 26 extending in the same direction to terminate in reverse looped ends 28. When fully installed into opening 18, arms 26 extend along the interior wall surfaces thereof with looped ends 28 protruding through slots 20. The length of slots 20 is such that looped ends 28 of arms 26 are restrained against longitudinal displacement and consequently serve to firmly seat coil 24 in axial opening 18. In addition, the linear configuration of the interior of opening 18 compresses arms 26 to provide the preloading designed to establish the predetermined resistance to the withdrawal of the pin from parts 12 and 14.

Once parts 12 and 14 are placed against each other with holes 13 and 15 therethrough in axial alignment, the retaining pin can be inserted into operative position with a single forward movement and, in order to facilitate this result, the end of pin body 16 is suitably tapered as indicated at 30 in FIG. 3. The opposite end of body 16 includes a handle 32 which may consist simply of a longitudinally split roll pin arranged to extend transversely through body 16 and of sufficient length to protrude from either side thereof to the extent necessary to provide a comfortable grasp for the human hand. As the tapered end 30 of the pin is inserted in hole 13 in part 12, the looped ends 28 of arms 26 contact the surface surrounding such hole and are cammed thereby into the interior of axial opening 18. However, as such looped ends 28 exit from the hole 15 in part 14, the resiliency of arms 26 biases such ends to again protrude through slots 20 thereby to contact the adjacent exterior surface of part 14. The forward insertion of the pin through parts 12 and 14 is halted at this time by a suitable stop 34 which may consist of a roll pin identical to that utilized for handle 32 but of shorter length. Stop pin 34 is located between handle 32 and slots 20 at the particular location determined by the size of the parts 12 and 14 to be joined and is also preferably oriented at right angles to handle 12 to facilitate the grasping thereof. Obviously, the withdrawal of the retaining pin from parts 12 and 14 is accomplished by pulling handle 32 with sufficient force to cam looped ends 28 into axial opening 18 in pin body 16.

The use of a unitary torsion member as the retention means for a quick release pin is a desirable improvement over the spring-biased balls heretofore employed. For one thing, the retention of the pin in the operative position is simply and economically accomplished by a single unitary member which can be readily replaced with a minimum of effort. Moreover, the configuration of the retention member in which it is mounted within the pin both contribute to the attainment of a highly desirable resistance against the various shocks, impacts, and vibrations to which the parts being joined may be subjected. In addition, the inherent resiliency of the torsional retention member ensures the proper operation thereof despite the accumulation of dirt or other foreign matter in the opening in which such member is contained.

We wish it to be understood that we do not desire to be limited to the exact details of the construction shown and described, for obvious modifications will occur to a person skilled in the art.

We claim:

1. In a pin for releasably joining a plurality of adjacent parts, an elongated body having an inwardly extending axial cylindrical recess at one end thereof, a torsion spring having a coil portion disposed adjacent the outer end of said axial recess, said coil portion being dimensioned diametrically substantially equal to the diameter of said recess for slidable engagement with the walls thereof, a pair of outwardly diverging flexible straight arms extending from said coil portion and responsive to the torsional action thereof, said arms extending inwardly of said recess and through their length being in linear contact with the interior wall surfaces thereof to thereby impart a prestress action to said spring, the ends of said arms remote from said coil portion terminating in laterally extending looped ends, a pair of openings disposed in opposite sides of said elongated body in coextensive relation with said looped ends whereby the outer portions of said looped ends normally protrude from said body for engagement with one of said parts, and laterally extending means carried by said body in spaced relation to said looped ends for engagement with another of said parts whereby said pin being disposed through all of said parts will securely fasten said parts between said looped ends and said laterally extending means.

* * * * *